J. H. DUFF.
CAR BRAKE.
APPLICATION FILED SEPT. 27, 1920.
1,384,454.
Patented July 12, 1921.
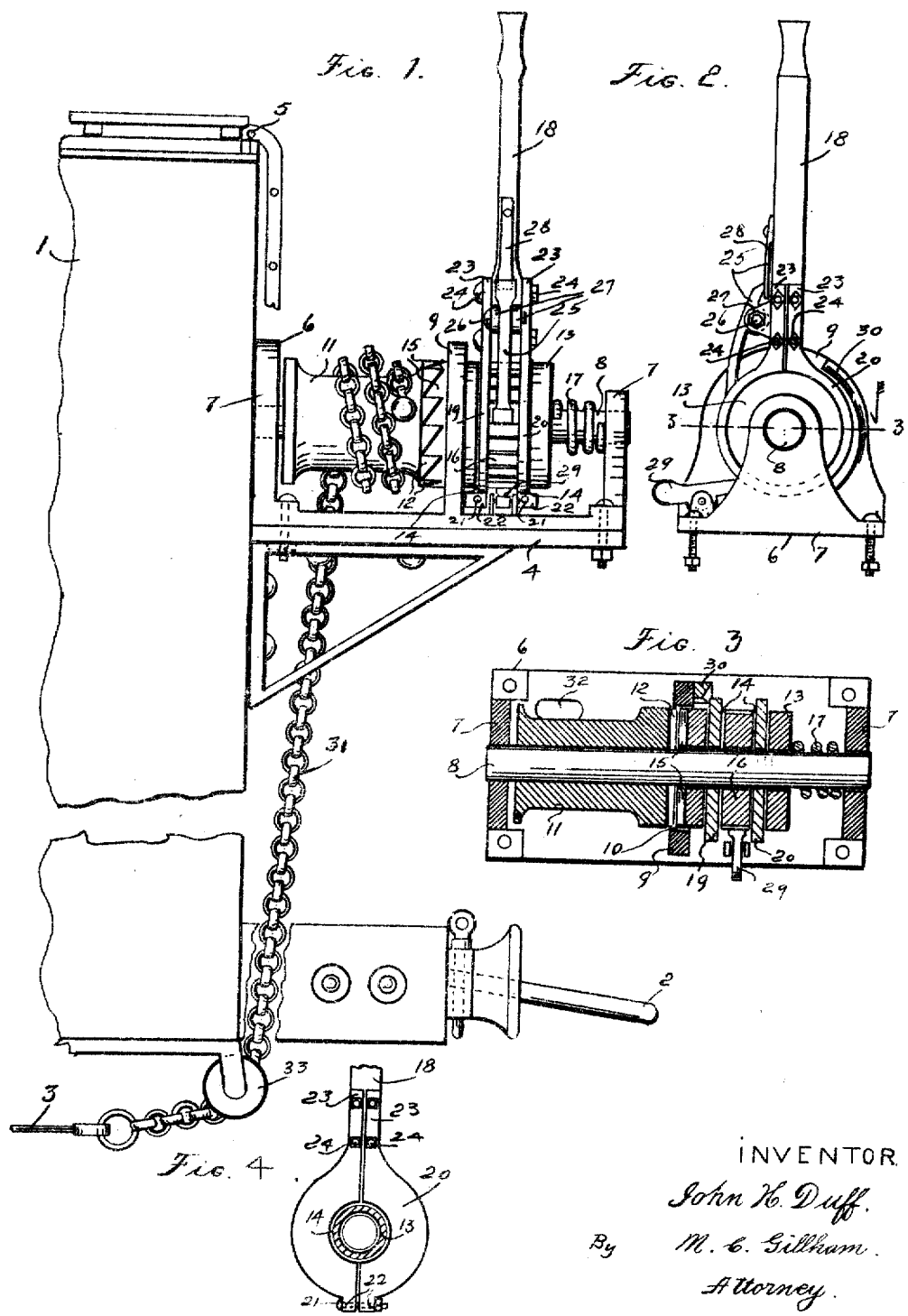
INVENTOR
John H. Duff.
By M. C. Gillham.
Attorney.

UNITED STATES PATENT OFFICE.

JOHN H. DUFF, OF KANSAS CITY, MISSOURI.

CAR-BRAKE.

1,384,454.  Specification of Letters Patent.  Patented July 12, 1921.

Application filed September 27, 1920. Serial No. 412,955.

*To all whom it may concern:*

Be it known that I, JOHN H. DUFF, a citizen of the United States, residing at Kansas City, in the county of Jackson and State of Missouri, have invented a new and useful Car-Brake, of which the following is a specification.

My invention relates to car brakes, and the objects of the invention are first, to provide a cheap, durable and efficient car brake for railroad cars and street railway cars which may be operated safely by one hand, second, to provide the brake with facilities for making quick brake applications and releases and third, to provide automatic means whereby the brake may be operated with safety to the brakeman.

I attain these objects and other advantages by the mechanism illustrated in the accompanying drawing in which—Figure 1, is a front view of a car brake embodying my invention and showing the same mounted on the end of a railway car. Fig. 2, is an end view of the same. Fig. 3, is a horizontal section of the same, on the line 3—3, in Fig. 2; and Fig. 4, is a side view of the lower portion of the lever, and showing the same rotatable on the mobile body, the latter being shown in section.

Similar reference numerals refer to corresponding parts throughout the several views.

The numeral 1, designates the end portion of a railway car, 2, the coupling thereof, 3, the brake rod connected with the customary brake rigging, not shown, 4, the usual platform for the convenience of brakemen, and the usual grab iron 5.

The car brake consists of a frame 6, having vertical end flanges 7, in which a shaft 8, is journaled. An annular flange 9, is arranged transversely of the frame and is provided with a concentrically formed opening 10. A drum 11, is secured on the inner end portion of the shaft 8, and ratchet teeth 12, are formed on the inner end thereof. A mobile concentrically formed body member 13, is mounted idly on the shaft 8, and provided with spaced annular channels 14, and with ratchet teeth 15, on its inner end, which teeth are adapted for engaging the ratchet teeth on the drum, the ratchet teeth on the ends of the drum and mobile body being radially extending. Ratchet teeth are formed on the periphery of the section of the body member 13, located between the channels 14, thereby forming a ratchet wheel section 16. A tension spring 17, is coiled about the shaft 8, and is arranged to normally press the body 13, inward, so that the teeth 15, thereon shall normally engage the teeth 12, on the drum. A hand lever 18, is provided for working the brake and it is provided on its lower end portion with split ring sections 19 and 20, which rings are adapted for entering the channels 14, and being clamped together by bolts 21, and their nuts, the latter bolts piercing lugs 22, on the lower sections of the rings. Extensions 23, are formed on the rings and are arranged to be attached on the sides of the lower portion of the lever proper, by bolts 24. The ring sections, when assembled with the lever, are arranged to turn on the body member 13, at the bottom of the channels 14. A pushing pawl 25, is pivotally mounted on the lever 18, by bolt 26, mounted in ears 27. A tension spring 28, is mounted on the lever 18, and the free end thereof is disposed under the upper end of the pawl 25, to hold the pawl engaged with the ratchet wheel section 16. A detaining pawl or dog 29, is pivotally mounted on the base of the frame and it is arranged to normally engage the ratchet wheel section 16, and detain the same and prevent backward rotation of the body member 13. A concentrically curved wedge shaped member 30, is mounted on the flange 9, at the border thereof and in the field of the back stroke of the lever 18, so that when a full back stroke of the lever is made, the latter will slidably engage the wedge and, thereby, force the body member 13, back against the tension of the spring 17, and disengage the ratchet teeth 12 and 15, thus permitting the drum to rotate backward. A chain 31, is partially wound on the drum 11, and, therefrom, passed through opening 32, in the base of the frame, over a roller or pulley 33, on the sill of the car, to a connection with the brake rod 3.

The car brake above described is a safety appliance intended to prevent injuries to brakemen when making brake applications. The provision of a hand lever permits the brakeman to hold on the usual grab iron by one hand and to apply the brake with the other hand and, at the same time, to view the environments and observe the necessity for emergency or other applications of the brake. The teeth or cogs on the drum and on the end of the body member 13, are held normally engaged with each other by the pressure of the spring 17. To apply the brake the lever 18, is pushed or pulled forward repeatedly and the pushing pawl rotates forwardly the entire assembly of parts and the detaining pawl serves to hold the same, in the well known manner of ratchet wheels. The forward rotation of the drum 11, winds the chain 31, thereon, thus the brake rigging is drawn to set the brake. To release the brake, the lever 18, is moved back a full stroke; in this movement, the lever encounters the wedge 30, and sliding thereon, forces the body member 13, apart from the drum 11, whereupon the chain is permitted to unwind as the brake rigging reacts. When the lever is returned forwardly, and is clear of contact with the wedge 30, the spring 17, reacts and presses the body member inwardly to an engagement with the drum 11.

Having described my invention what I claim is—

In a car brake, the combination with a car having brake rigging, of a frame mounted on the car, a shaft journaled in said frame, a drum secured on said shaft and having radially extending ratchet teeth on its inner end, a mobile member mounted idly on said shaft and having radially extending ratchet teeth on its inner end and adapted for engaging and disengaging the ratchet teeth on said drum and provided with a ratchet wheel section, a coiled spring loosely mounted on said shaft and normally pressing said mobile member to engagement with said drum, a lever rotatably mounted on said mobile member, a spring actuated pushing pawl mounted on said lever and engaging the ratchet wheel on said mobile member, a pawl normally detaining said mobile member from backward rotation, and a concentrically curved wedge shaped member on said frame and in the field of the back stroke of said lever and adapted for forcing the mobile member apart from the drum.

Dated Kansas City, Jackson county, Missouri, September 22d, 1920.

JOHN H. DUFF.

Witnesses:
S. B. CRANE,
BATTLE McCARDLE.